United States Patent Office 3,334,087
Patented Aug. 1, 1967

3,334,087
N-ACYL DERIVATIVES OF 3-AZA-BICYCLO[3.2.2]NONANE
Vada L. Brown, Jr., and Theodore E. Stanin, Kingsport, Tenn., assignors to Eastman Kodak Company, Rochester, N.Y., a corporation of New Jersey
No Drawing. Filed Apr. 29, 1963, Ser. No. 276,195
6 Claims. (Cl. 260—239)

This invention relates to new chemical compounds and more particularly to novel N-acyl derivatives of 3-azabicyclo[3.2.2]nonane.

The synthesis of 3-azabicyclo[3.3.2]nonane is described in patent application of Brown, Smith and Stanin, Ser. No. 82,373, filed Jan. 13, 1961, and now abandoned, and in the continuation-in-part thereof, Ser. No. 196,494, filed May 21, 1962, now U.S. Patent 3,280,105. The compound can be prepared by the catalytic deamination of 1,4-cyclohexanebis(methylamine) in vapor phase. The procedure comprises feeding 1,4-cyclohexanebis(methylamine) with nitrogen at a constant rate through a heated catalyst bed, e.g., catalytic alumina, at a temperature of 350 to 450° C.

The compounds of the invention are amides that are N-acyl derivatives of 3-azabicyclo[3.2.2]nonane, such derivatives being of the following general formulae:

(I)
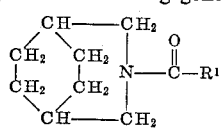

and (II)
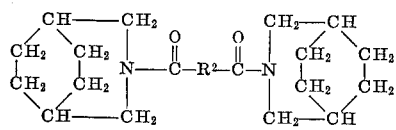

wherein $R^1$ is the residue of an organic monocarboxylic acid and $R^2$ is the residue of an alkanedioic acid.

The compounds of the invention are prepared by reacting 3-azabicyclo[3.2.2]nonane with an organic monocarboxylic acid or an alkanedioic acid or with the corresponding acid anhydrides or acid chlorides.

By "organic monocarboxylic acid" we mean aliphatic (including straight chain, branched chain and cycloaliphatic) monocarboxylic acids such as alkanoic acids, cycloalkanoic acids and alkenoic acids and such acids having one or more monovalent substituents such as a halogen atom, a lower alkyl substituted or unsubstituted phenyl radical or a lower alkyl substituted or unsubstituted phenoxy radical and aromatic monocarboxylic acids such as carbocyclic aromatic monocarboxylic acids and five membered heterocyclic aromatic monocarboxylic acids including such acids having lower alkyl substituents on one or more of the ring carbon atoms.

By alkanedioic acids we mean to include saturated dicarboxylic acids of the formula $HOOC-R^2-COOH$ wherein $R^2$ is a saturated, branched or straight chain bivalent hydrocarbon radical of 1 to 18 carbons.

Examples of suitable organic monocarboxylic acids for use in preparing the compounds of our invention are those having from 1 to 18 carbon atoms and include monocarboxylic acids such as formic acid, cyclohexanecarboxylic acid, acrylic acid, furoic acid, acetic acid, methacrylic acid, propionic acid, cinnamic acid, phenylacetic acid, oleic acid, n-butyric acid, chloroacetic acid, 2-phenoxypionic acid, palmitic acid, lauric acid, stearic acid isobutyric, valeric, caprylic and the like.

Examples of suitable alkanedioic acids for use in preparing the compounds of our invention are those having from 1 to 18 carbon atoms and include dicarboxylic acids such as adipic acid, dimethyl malonic acid, etc.

The preparation of the compounds of the invention can be represented by the following equations:

(I)
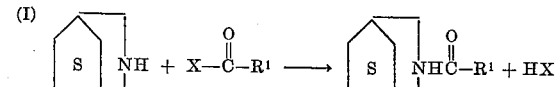

and (II)
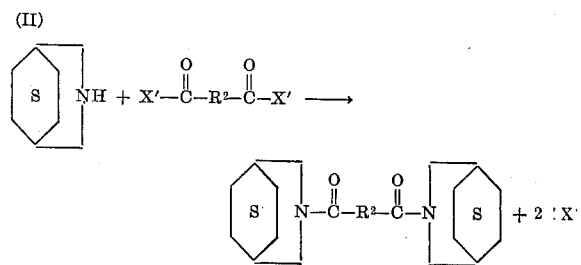

wherein $R^1$ is the residue of an organic monocarboxylic acid, $R^2$ is the residue of an alkanedioic acid, X is —OH, —Cl or

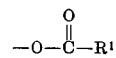

and X' is —OH or —Cl.

The preparation of compounds in accordance with the invention is illustrated by the following examples.

EXAMPLE 1

*3-acetyl-3-azabicyclo[3.2.2]nonane*

To a 250 cc. three-neck flask equipped with a stirrer, condenser, addition funnel and thermometer was added 62.5 g. (0.5 mole) of 3-azabicyclo[3.2.2]nonane. Stirring was started and 102 g. (1.0 mole) of acetic anhydride was added at such a rate as to maintain the temperature of the reaction at or just below reflux (10 min. was required for the addition). The reaction mixture was then cooled and the product collected by filtration to yield 59.7 g. (71.6%) of 3-acetyl-3-azabicyclo[3.2.2]nonane, which after crystallization from cyclohexanebenzene with activated carbon for decolorizing had a melting point of 87 to 91° C.

*Analysis.*—Calcd. for C, 71.87%; H, 10.17%; N, 8.38%. Found: C, 71.60%; H, 10.30%; N, 8.40%.

EXAMPLE 2

*3-phenylacetyl-3-azabicyclo[3.2.2]nonane*

To a one (1) l., 3-neck flask equipped with a stirrer, thermometer, condenser, addition funnel and water bath was added 31.4 g. (0.25 mole) 3-azabicyclo[3.2.2]nonane, 11 g. (0.275 mole) sodium hydroxide, and 300 ml. of water. To this stirred mixture was added 38.6 g. (0.25 mole) phenylacetyl chloride over a seven-minute period. The temperature rose from 39° C. to 64° C. After the addition of the 3-phenylacetyl chloride had been completed, the reaction mixture was stirred for one (1) hr. without external heating or cooling. The reaction mixture was cooled to 10° C. and the solid product collected by filtration, which, after drying, yielded 60 g. (98% of theory) of crude 3-phenylacetyl-3-azabicyclo[3.2.2]nonane. Recrystallization from methyl alcohol yielded a product with a melting point of 70–72° C.

*Analysis.*—Calcd. for C, 79.02%; H, 8.64%; N, 5.76%. Found: C, 78.87%; H, 8.80%; N, 5.76%.

EXAMPLE 3

*1,6-bis(3-azabicyclo[3.2.2]non-3-yl)-1,6-hexanedione*

In a manner described in Example 2, 20 g. (0.5 mole) sodium hydroxide, 50 g. (0.4 mole) 3-azabicyclo[3.2.2]nonane, 250 ml. of water and 36.6 g. (0.2 mole) of adipoyl chloride were reacted to yield 32 g. (44.4%) of crude 1,6 - bis(3-azabicyclo-[3.2.2]non-3-yl-1,6-hexanedione. Recrystallization from methyl alcohol yielded a product with a melting point of 114–115° C.

*Analysis.*—Calcd. for C, 73.35%; H, 9.99%; N, 7.78%. Found: C, 73.10%; H, 9.80%; N, 7.79%.

EXAMPLE 4

*1,6-bis(3-azabicyclo[3.2.2]non-3-yl)-1,6-hexanedione*

To a 500-ml., three-neck flask equipped with stirrer, condenser, thermometer, and dropping funnel was added 25 g. (0.2 mole) 3-azabicyclo[3.2.2]nonane and 150 ml. of pyridine. To this stirred solution was added 18.3 g. (0.1 mole) of adipoyl chloride over a 10-min. period, during which time the temperature rose from 24° C. to 59° C. The reaction mixture was stirred one hr. then drowned in excess water. The solid product was collected by filtration to yield 29 g. (80%) of 1,6-bis(3-azabicyclo[3.2.2]non - 3 - yl) - 1,6-hexanedione. Purification by the method of Example 3 yielded a product which melted at 115–117° C. and was identical with material of Example 2 by infrared.

EXAMPLE 5

*3-phenoxyacetyl-3-azabicyclo[3.2.2]nonane*

In a manner described in Example 2, 31.2 g. (0.25 mole) 3-azabicyclo[3.2.2]nonane, 11 g. (0.275 mole) sodium hydroxide, 200 ml. of water, and 42.6 g. (0.25 mole) phenoxyacetyl chloride were reacted to yield 53 g. (82%) of crude 3 - phenoxyacetyl - 3 - azabicyclo[3.2.2]nonane. Recrystallization from methyl alcohol yielded a product with a melting point of 101–103° C.

*Analysis.*—Calcd. for C, 74.14%; H, 8.1%; N, 5.41%. Found: C, 73.95%; H, 8.47%; N, 5.31%.

EXAMPLE 6

*3-chloroacetyl-3-azabicyclo[3.2.2]nonane*

In a manner described in Example 2, 12.2 g. (0.305 mole) sodium hydroxide, 200 ml. of water, 37.5 g. (0.3 mole) 3-azabicyclo[3.2.2]nonane and 33.9 g. (0.3 mole) chloroacetyl chloride were reacted at a temperature below 20° C. to yield 25 g. (41.5%) of crude 3-chloroacetyl-3-azabicyclo[3.2.2]nonane. Recrystallization from 2B alcohol yielded a product with a melting point of 73–76° C.

*Analysis.*—Calcd. for C, 59.38%; H, 7.94%; N, 6.95%. Found: C, 59.87%. H, 8.24%; N, 6.76%; Cl, 17.62%.

EXAMPLE 7

*3-cinnamoyl-3-azabicyclo[3.2.2]nonane*

In a manner described in Example 2, 25.0 g. (0.20 mole) 3-azabicyclo[3.2.2]nonane, 8.1 g. (0.202 mole) sodium hydroxide, 150 ml. water, and 33.3 g. (0.20 mole) cinnamoyl chloride were reacted to yield 51.5 g. (100%) of crude 3-azabicyclo[3.2.2]nonane. Recrystallization from methyl alcohol yielded a product with a melting point of 104–105° C.

*Analysis.*—Calcd. for C, 80.01%; H, 8.23%; N, 5.49%. Found: C, 79.49%; H, 8.21%; N, 5.54%.

EXAMPLE 8

*3-(2-phenoxypropionyl)-3-azabicyclo[3.2.2]nonane*

In a manner described in Example 2, 25.0 g. (0.20 mole) 3-azabicyclo[3.2.2]nonane, 8.1 g. (0.202 mole) sodium hydroxide, 150 ml. water, and 36.9 g. (0.20 mole) 2-phenoxypropionyl chloride reacted to yield 47.7 g. (84%) of crude 3 - (2 - phenoxypropionyl)-3-azabicyclo[3.2.2]nonane. Recrystallization from methyl alcohol yielded a product with a melting point of 83–86° C.

*Analysis.*—Calcd. for C, 74.74%; H, 8.42%; N, 5.13%. Found: C, 74.87%; H, 8.46%; N, 5.10%.

EXAMPLE 9

*3-azabicyclo[3.2.2]nonane-3-cyclohexanecarbonyl*

In a manner described in Example 2, 25 g. (0.20 mole) 3-azabicyclo[3.2.2]nonane, 8.1 g. (0.202 mole) sodium hydroxide, 200 ml. water, and 29.3 g. (0.20 mole) cyclohexanecarbonyl chloride were reacted to yield 42.3 g. (89.5%) of crude 3-azabicyclo[3.2.2]nonane-3-cyclohexanecarbonyl. Recrystallization from methyl alcohol yielded a product with a melting point of 80–83° C.

*Analysis.*—Calcd. for C, 76.61%; H, 10.63%; N, 5.98%. Found: C, 76.52%; H, 10.45%; N, 5.83%.

EXAMPLE 10

*3-palmitoyl-3-azabicyclo[3.2.2]nonane*

In a manner described in Example 2, 45.4 g. (0.362 mole) of 3-azabicyclo[3.2.2]nonane, 14 g. (0.35 mole) of sodium hydroxide, 300 ml. water, and 100 g. (0.364 mole) of palmitoyl chloride were reacted to yield 120 g. (92%) of 3 - palmitoyl-3-azabicyclo[3.2.2]nonane. Recrystallization from methyl alcohol yielded a product which melted at 56–58° C.

*Analysis.*—Calcd. for C, 79.35%; H, 12.39%; N, 3.86%. Found: C, 79.27%; H, 12.43%; N, 3.88%.

EXAMPLE 11

*1,3-bis(3-azabicyclo[3.2.2]non-3-yl)-2,2-dimethyl-1,3-propanedione*

To a stirred solution of 45.6 g. (0.365 mole) of 3-azabicyclo[3.2.2]nonane in 50 ml. of benzene and 100 ml. of ethyl ether was added 25 g. (0.148 mole) of dimethylmalonyl chloride in 100 ml. of ether. The solids were collected by filtration, then washed with water one time and with dilute aqueous potassium carbonate one time. Recrystallization from methyl alcohol yielded 9.8 g. (17.1%) of 1,3 - bis(3 - azabicyclo[3.2.2]non - 3-yl)-2,2-dimethyl-1,3-propanedione, M.P. 145–148° C.

*Analysis.*—Calcd. for C, 72.79%; H, 9.89%; N, 8.08%. Found: C, 72.92%; H, 9.91%; N, 7.92%.

EXAMPLE 12

*3-(2-furoyl)-3-azabicyclo[3.2.2]nonane*

In a manner described in Example 2, 37.5 g. (0.30 mole) 3-azabicyclo[3.2.2]nonane, 12.2 g. (0.305 mole) sodium hydroxide, 200 ml. water, and 39.2 g. (0.30 mole) 2-furoyl chloride were reacted to yield 65.2 g. (99%) of crude 3-(2-furoyl)-3-azabicyclo[3.2.2]nonane. Recrystallization from ether yielded a product which melted at 75–78° C.

*Analysis.*—Calcd. for C, 71.25%; H, 7.76%; N, 6.39%. Found: C, 71.55%; H, 7.91%; N, 6.34%.

EXAMPLE 13

*3-stearoyl-3-azabicyclo[3.2.2]nonane*

To a one (1) liter 3-neck flask equipped with a stirrer, thermometer, condenser, addition funnel and water bath was added 25 g. (0.625 mole) sodium hydroxide, 430 ml. of water, and 60 g. (0.48 mole) 3-azabicyclo[3.2.2]nonane. To this stirred mixture was added 146 g. (0.48 mole) of stearoyl chloride at such a rate as to maintain the reaction temperature at or just below 50° C. After the addition of the stearoyl chloride had been completed, the reaction mixture was stirred for five (5) hours without external heating or cooling. The reaction mixture was cooled to 25° C. and the solid product collected by filtration, which after drying yielded 189 g. (100%) of crude 3-stearoyl-3-azabicyclo[3.2.2]nonane. Recrystallization from methyl alcohol yielded a product with a melting point of 64–65° C.

*Analysis.*—Calcd. for C, 79.81%; H, 12.52%; N, 3.58%. Found: C, 79.31%; H, 12.68%; N, 3.55%.

EXAMPLE 14

3-lauroyl-3-azabicyclo[3.2.2]nonane

In a manner of Example 13, 10 g. (0.25 mole) sodium hydroxide, 190 ml. water, 25 g. (0.2 mole) 3-azabicyclo [3.2.2]nonane and 43.8 g. (0.2 mole) lauroyl chloride were allowed to react to yield 55.8 g. (91%) of crude 3 - lauroyl - 3 - azabicyclo[3.2.2]nonane. Recrystallization using hexane yielded a product with a melting point of 38–40° C.

*Analysis.*—Calcd. for C, 78.17%; H, 12.04%; N, 4.56%. Found: C, 77.85%; H, 12.16%; H, 4.59%.

EXAMPLE 15

3-oleoyl-3-azabicyclo[3.2.2]nonane

In the manner of Example 13, 14 g. (0.35 mole) sodium hydroxide, 300 ml. water, 41.5 g. (0.332 mole) 3-azabicyclo[3.2.2]nonane and 100 g. (0.332 mole) oleoyl chloride were allowed to react. After the reaction had been completed (3 hours) the reaction mixture was extracted three (3) times with 200 ml. of benzene each time. The organic layers were combined, concentrated and the residual oil distilled in vacuo to yield 100 g. (72.5%) 3-oleoyl-3-azabicyclo[3.2.2]nonane, B.P. 150–163° C. (110–115$\mu$).

*Analysis.*—Calcd. for N, 3.6%; M.P. −2 to −5° C.; $n_D^{20}$ −1.4940; Br. No. 39.1 (Theory Br. No. 41.04). Found: N, 3.64%.

EXAMPLE 16

3-azabicylo[3.2.2]nonane-3-acryloyl (X–5959–40)

A 1 l. 3-necked flask was fitted with a stirrer, Y joint, thermometer, and two dropping funnels. 3-azabicyclo [3.2.2]nonane (85 g.—0.68 mole), 200 ml. of benzene and 0.7 g. of sulfur were placed in the flask and cooled to 10–15° C. by means of an ice bath. A solution of 68 g. (0.75 mole) of acrylyl chloride in 100 ml. of benzene was slowly added through one dropping funnel while a solution of 44.4 g. (0.42 mole) of Na$_2$CO$_3$ in 120 ml. of water was added through the other dropping funnel. The addition required 1.5 hr. and the reaction temperature was maintained at 10–15° C. The mixture was stirred 3 hr. after the addition was completed. Added benzene and water to dissolve solid material and separated benzene solution. Washed benzene solution with water and dried benzene solution over Na$_2$SO$_4$. Added 0.04% hydroquinone monomethyl ether and concentrated the solution under vacuum at room temperature. Residue weighed 85 g. (47%).

Distillation of 40 g. of this material, to which 0.5 g. of methylene blue and 0.2 g. of CuCl were added, gave 20 g. of product, B.P. 122–127° C./2–2.5 mm.

EXAMPLE 17

3-azabicyclo[3.2.2]nonane-3-methacryloyl (X–5959–87)

This compound was prepared by the above procedure using 125.5 g. (1.2 moles) of methacrylyl chloride in 100 ml. of benzene, 125 g. (1.0 mole) of 3-azabicyclo [3.2.2]nonane in 250 ml. of benzene, 1.0 g. of sulfur and 65 g. (0.65 mole) of Na$_2$CO$_3$ in 150 ml. of water.

Distillation of the product gave 130 g. (67%) of material, B.P. 114–118° C./1.5–2.0 mm.

The novel compounds of our invention are useful as fungicidal agents and can be used as fungicidal agents for plants, for example, by coating the plant with a solution of the compound of our invention in a volatile or non-volatile solvent such as methyl or ethyl alcohol.

Compounds of the invention made from unsaturated acids, such as the amide of Examples 16 and 17, can be copolymerized with acrylonitrile and other vinyl monomers to produce polymers that can be formed into useful heat stable fibers, having good affinity for dyes.

The invention has been described in considerable detail with particular reference to certain preferred embodiments thereof, but it will be understood that variations and modifications can be effected within the spirit and scope of the invention as described hereinbefore and as defined in the appended claims.

We claim:
1. 3-acetyl-3-azabicyclo[3.2.2]nonane.
2. 3-acryloyl-3-azabicyclo[3.2.2]nonane.
3. 3-oleoyl-3-azabicyclo[3.2.2]nonane.
4. 3-stearoyl-3-azabicyclo[3.2.2]nonane.
5. 1,6-bis(3-azabicyclo[3.2.2]non-3-yl) - 1,6 - hexanedione.
6. 3-lauroyl-3-azabicyclo[3.2.2]nonane.

No references cited.

ALTON D. ROLLINS, *Primary Examiner.*

WALTER A. MODANCE, *Examiner.*